April 20, 1943.  J. DUSEVOIR  2,317,262
APPARATUS FOR MACHINING SERRATIONS IN METALLIC BODIES
Filed Nov. 12, 1941
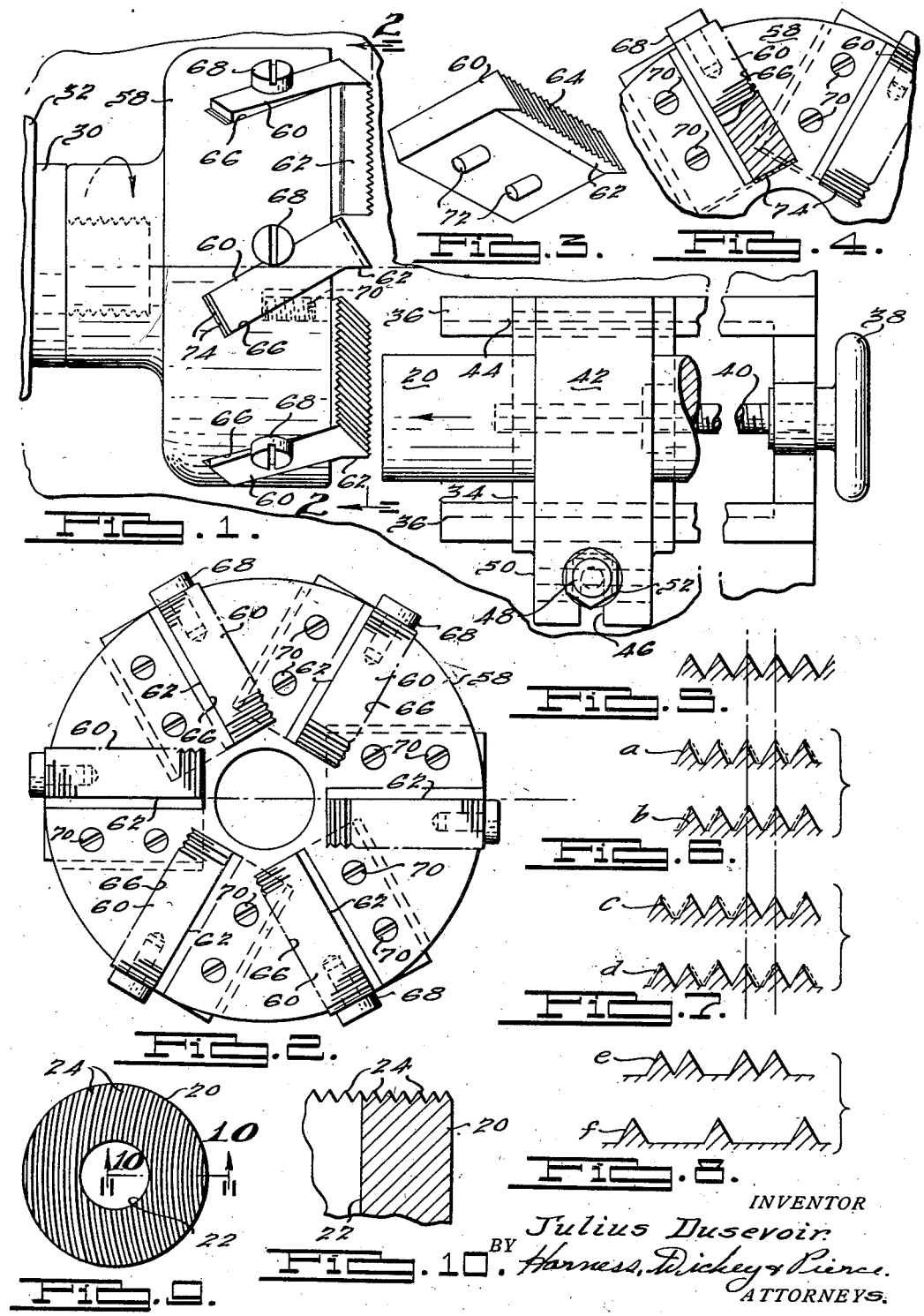

Patented Apr. 20, 1943

2,317,262

UNITED STATES PATENT OFFICE 2,317,262

APPARATUS FOR MACHINING SERRATIONS IN METALLIC BODIES

Julius Dusevoir, Dearborn, Mich., assignor to Century Motors Corporation, Dearborn, Mich., a corporation of Michigan Application November 12, 1941, Serial No. 418,678

7 Claims. (Cl. 29—105)

This invention relates to apparatus for forming serrations in metallic bodies and has for its principal object the provision of apparatus of this type that is simple in construction, efficient in operation and economical to manufacture.

Objects of the invention include the provision of a cutting tool including a plurality of serrated cutter blades for machining curved serrations in a metallic surface; the provision of a device of the type described including a rotatable head supporting one or more generally radially disposed cutter blades having serrated cutting edges disposed on an axial face of the head; the provision of a tool of the type described in which each cutter blade is disposed with its cutting edge radial with respect to the axis of rotation the head; the provision in a tool of the type described of a novel means of adjustably supporting the cutter blade permitting sharpening of the blades without destroying the radial relation of the cutting edges thereof with respect to the axis of rotation of the head; and the provision of a tool of the type described so constructed and arranged as to permit axial shifting of the cutter blades in a quick and accurate manner when desired.

Further objects of the invention include the provision of a tool for machining serrations in a metallic surface whereby smoother serrations are formed with the expenditure of a smaller amount of power; the provision of a tool for forming serrations in a metallic surface by the use of serrated cutter blades so constructed and arranged as to remove metal from the surface in a pre-selected manner; the provision of a tool as above described in which certain of the serrations of the cutter blades remove metal from one side only of the serrations being formed in the work while others remove metal from other sides of the serrations being formed in the work; and the provision of a tool as above described in which the serrated edges of the cutter blade are so constructed and arranged that successive cutter blades remove metal from different portions of the serrations being formed in the work.

The above being among the objects of the present invention the same consists in certain novel features of construction and combinations of parts, together with novel steps of operation, to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, partially broken plan view of a machine constructed in accordance with the present invention for forming curved serrations in an end face of a cylindrical piece of work;

Fig. 2 is a face view of the cutter head illustrated in Fig. 1, taken as looking on the line 2—2 of Fig. 1;

Fig. 3 is a perspective view of one of the cutter blades employed in the cutter head shown in the preceding views;

Fig. 4 is a fragmentary view similar to Fig. 2 but illustrating the manner in which the cutter blades are shifted in the head for the purpose of machining a piece of work to be mated with one which has been serrated previous to such shifting;

Figs. 5 to 8, inclusive, are more or less diagrammatic fragmentary views illustrating different forms of cutting teeth for the cutter blades shown in the preceding views;

Fig. 9 is an end view of the piece of work shown mounted in the machine in Fig. 1 after it has been serrated; and, Fig. 10 is an enlarged fragmentary, sectional view taken on the line 10—10 of Fig. 9.

The present invention is applicable for use in the serrating of a surface of a part which is adapted to be arranged in abutting relation with respect to a complementarily serrated surface of another part adapted to be connected thereto. The interfitting serrations of the two faces in such case serve as a means for preventing relative displacement between the two parts in the plane of their mating faces except in the direction of the serrations themselves. Broadly speaking such serrated connections may be employed between any two members having abutting faces regardless of the character or contruction of the members. However, one such use is in the connection between the various separately formed parts of a built-up crankshaft such as shown and claimed in my United States Letters Patent No. 2,013,039, issued Sept. 3, 1935 on Crankshaft. Where such serrated connections are to be employed between the various elements of a built-up machine part, such as the crankshaft disclosed in my United States Letters Patent above identified, it is essential in obtaining the desired final result that the serrations on opposed faces of such element being accurately formed and, where one or more of the elements are to be interchangeable with other similarly formed elements, it will be appreciated that a uniformity in the size, contour and location of such serrations is necessary in order to obtain the desired result.

The present invention provides a means by which such uniformity of result may be obtained and a method by means of which it may be obtained in a desired state of accuracy and finish and with the expenditure of a minimum amount of power in carrying it out.

In the drawing, by way of illustration only, and as indicated in Figs. 1, 9 and 10, the piece of work there shown comprises a shaft section or other cylindrical piece of work 20 having a central bore 22 and an end face arranged in perpendicular relation with respect to its axis. As best brought out in Figs. 9 and 10 which show such piece of work 20 with its end surface in finished serrated condition, such end face is provided with a multiplicity of parallel serrations 24 thereon, such serrations being of curved conformation struck from a center outside of the periphery of the piece of work and, of course, of uniform size throughout. While in the broader aspects of the invention the particular cross-sectional contour of the serrations 24 may vary considerably as long as such contour is such as to permit the serrations on a pair of members to be connected thereby to be readily interfitted by engagement of and disconnected from each other through separation of, the serrated faces, for the purpose of illustration the serration 24, as best brought out in Fig. 10, are of triangular section having straight sides all disposed at equal angles with respect to the general plane of the surface on which they are formed.

In machining the serrations in accordance with the present invention any suitable machine tool may be employed that is provided with a rotatable spindle and a support, that may be moved relative to each other in the general direction of the axis of the spindle. An ordinary lathe is illustrative of this type of machine tool, is satisfactory for use in accordance with the present invention, and is assumed to be shown in Fig. 1. As indicated in that figure the lathe spindle is indicated at 30 and as being rotatably supported in a suitable or conventional spindle bearing 32. A V-block 34 is suitably mounted upon the bed of the lathe in parallelism with but eccentric to the axis of rotation of the spindle 30 for movement in a direction parallel to the axis of the spindle 30 towards and away from the same. The V-block may thus be mounted upon the usual carriage of the lathe or, as indicated in Fig. 1, it may be mounted upon a pair of ways such as 36 suitably secured to the bed of the lathe and controlled in its position axially of the spindle 30 by means of a hand wheel such as 38 and screw 40. The work 20 is received by the V-block 34 and, therefore, arranged with its axis parallel to the axis of the spindle 30, and may be clamped against movement in the V-block 34 in any suitable manner. The particular means shown consists of a clamping bar 42 hinged at one end to one side of the V-block 34 by means of a pin such as 44, and is slotted as at 46 at its opposite end for reception of a bolt 48. The bolt 48 is pivoted at its lower end by means of a pin 50 to the V-block 34 so as to enable its opposite end to swing into and out of the slot 46. The bolt 48 carries a nut 52 at its upper end which when drawn down while the upper end of the bolt 48 is within the slot 46 securely clamps the work 20 in the V-block 34.

By loosening the nut 52 the upper end of the bolt 48 may be swung outwardly out of the notch 46 thus permitting the clamp 42 to be swung upwardly about the axis of the pin 44 and permitting the work 20 to be removed and replaced by new work.

In order to form the serrations in the end face of the work 20 a head indicated generally at 58 is mounted upon the end of the spindle 30 in a conventional manner. Such heads are conventionally known as "cat heads." In accordance with the present invention the head 58 carries one or more cutter blades 60 therein, six such cutter blades being shown in the drawing by way of illustration and at least this number being preferable in actual practice. Each cutter blade 60, as best brought out in Fig. 3, comprise a rectangular sectioned main body portion of uniform thickness and a cutting edge portion having an angularly offset cutting face 62 and an adjoining serrated end face 64. As indicated in Fig. 1 the blades 60 are received in slots 66 formed in the head 58 and opening both of the front axial face of the head 58 and on the periphery thereof. The plane of thickness of each slot 66 is such, with respect to the axis of the head 58 and the angularity of the face 62 with respect thereto, that when the blades 60 are received in their corresponding slots 66 the cutting edge portion only of the blades 60 project axially beyond the outer face of the head 58 and the face 62 is arranged in a plane including the axis of rotation of the head 58. In other words the faces 62 of the cutter blades 60 are radially disposed with respect to the axis of rotation of the head 58. It will be appreciated that for this arrangement it is necessary for each slot 66, in extending axially away from the front face of the head 58 to be inclined in the direction of normal rotation of the head 58 as best shown in Fig. 1.

Each blade 60 is held against radial displacement of the head 58 by means of a screw 68 threaded radially into the head 58 in adjacent relationship with respect to each slot 66 and with its head partially overlapping the radially outer edge of the associated cutter blade 60. Each cutter blade 60 is maintained axially of the head 58 in the bottom of its associated block 66 by means of a pair of screws 70 which thread through the axially outer face of the head 58 in parallel relation with respect to the axis of rotation thereof and, projecting into the corresponding slots 66, bear against seats 72 formed in each cutter blade 60 as best illustrated in Fig. 3. In this latter connection it may be noted that one or more shims or spacers 74 are preferably, but not necessarily, inserted in the inner axial end of each slot 66 for spacing the corresponding edge of the corresponding cutter blade from such end of the slot and, therefore, control the amount which the cutter blades project axially outwardly beyond the outer axial face of the head 58.

The angularity of the serrated end face 64 of each cutter blade 60 is such as to provide ample clearance for the cutting edge of the blade in operation. The serrations themselves are of such size and contour that, when viewed in a direction perpendicular to the face 62, they are complementary in whole, or in part as will hereinafter be more fully explained, with the exact size, shape and contour of the serrations which it is desired to form in the work, in other words and in the particular embodiment shown, with the serrations 24. Where the serrations of the blades 60 are thus exactly complementary to the serrations 24 to be formed in the work they will then appear, as viewed perpendicularly with respect to their corresponding cutter face 62, as indicated in Fig. 5.

Assuming for the moment that the serrated edges of the blades 60 are of the conformation illustrated in Fig. 5 and as above explained, then the cutters may be adjusted in the head 58 to serrate the work in accordance with either of two methods. The simplest and preferred method is to adjust all of the cutter blades 60 so that their serrated edges project exactly the same distance outwardly from the outer axial face of the head 58 and, of course, so that each serration of the cutting edge of each blade will lie in the same circle about the axis of rotation of the head 58 as the corresponding serrations on each of the remaining cutter blades 60. This last feature is preferably obtained by making the radial end walls of all of the slots 66 at exactly the same distance from the axis of rotation of the head 58 and machining all of the cutter blades 60 so that all of the serrations thereon bear exactly the same relation with respect to that end thereof which is to abut against such radial inner wall of the slots 66.

With the various cutter blades 60 located as above described and assuming that the V-block 34 is so located as to support the work at the desired distance from the axis of rotation of the head 58 to obtain the proper degree of curvature to the serrations 24 to be formed thereon, the head 58 is caused to be rotated and the work 20 is fed axially into engagement with the cutter blades 60, in the particular case shown by rotation of the wheel 38. The work is slowly fed into the rotating cutter blades and the serrated edges of the latter thus act to remove metal therefrom in exact accordance with the serrated edges of the blades, and the feeding movement of the work into the cutter blades is continued until the end surface of the work 20 is provided with complete serrations thereon.

The other method of forming the serrations on the end surface of the work 20 consists in adjusting the various cutter blades 60 so that each successive cutter blade 60 over one complete turn of the head 58 projects a slightly greater amount than the preceding blade axially outwardly from the end face of the head 58. Preferably in such case the amount one cutter blade projects outwardly beyond its next preceding cutter blade in the direction of rotation of the head 58 decreases. In such case the head 58 when stationary is positioned in such a rotatable position that the cutter blade 60 projecting the least amount from the end face of the head 58 will first engage the work, and the work is initially moved to or located axially of the head 58 at a predetermined position which will insure complete machining of the serrations thereon, and is locked against movement. The head 58 is then caused to turn through one complete revolution under which condition each cutter blade 60 in moving over the end of the work will remove in one pass its share of the entire metal to be removed from the end of the piece of work and, after the last cutter has passed over the end of the work the serrations 24 on the work will have been completely formed. Thus in accordance with this method only one complete revolution of the cutter head 58 is necessary to completely machine the serrations in the end of the work. When such method is followed, then it is preferable to use a greater number of cutter blades 60 than shown although the method may be carried out with the number of cutter blades shown if necessary. The reason for desiring the greater number of cutter blades in such case is that the last two or three cutters in such case should be adjusted to remove a very slight amount of metal only so as to result in serrations on the work having a high degree of finish.

It will be appreciated that if two cylindrical pieces of work, such as the workpiece 20 illustrated, or equivalent pieces of work, are supported in the same position in the machine and serrated with the same positioning of the cutter blades 60, when the two pieces of work are positioned with their serrated faces in contact the serrations of both pieces cannot be arranged in interfitting relation with respect to each other. This is because the high points of the serrations on one of the pieces must fit within the low points of the serrations of the other of the pieces to effect a perfect interfitting relationship, requiring the high points of the serrations on one piece to correspond in curvature to the low points of the serrations on the other piece, whereas, under the conditions assumed, the high points of the serrations on both pieces are struck from equivalent centers. Accordingly, in order to have the serrations of one of the pieces accurately interfit with the serrations of the other of the pieces when such pieces are arranged in end-to-end relationship, it is necessary that the serrations of one piece be offset from the serrations of the other piece about a common center for all of the serrations by a distance equal to half the pitch of, or distance between, the serrations.

In order to permit this desired arrangement of interfitting serrations to result by the use of the apparatus shown, after one of the pieces has been machined in accordance with either of the methods above described, the blades 60 are loosened in their respective slots 66 and a shim 74, illustrated in Fig. 4, is inserted between the radially inner end of each cutter blade 60 and the corresponding end of its slot 66, after which the cutter blades 60 are re-secured in position. The shims 74 in such case are of a thickness such as to shift the cutter blades 60 outwardly in their respective slots 66 an amount to bring the high points of the serrations of the blades in alignment, radially of the head 58 with those points at which the low points of the serrations were formerly located during the preceding machining operation. Accordingly, when another piece is then machined with the cutter blades 60 re-adjusted as described and as indicated in Fig. 4, the serrations 24 which will be formed upon the corresponding piece of work, will be struck from a center corresponding exactly to the center from which the previous serrations were struck, but the serrations in this case will have their high points located radially from such center from the high points of the serrations formed on the previous member by a distance equal to half of the distance between the serrations. Accordingly, in such case, when the two parts or pieces are placed in end-to-end relationship with the serrated faces abutting, the serrations of one of the pieces may be perfectly interfitted with the serrations of the other piece and the desired relation of parts thus obtained. With such arrangement of serrations on two pieces, where the two pieces are cylindrical shafts or shaft sections, for instance, the two shafts may, as will be readily appreciated, be arranged in concentric relation with respect to each other and with the serrations of both pieces accurately interfitting one another so that while the serrations of the two pieces are maintained in interfitting relationship relative movement between the abutting faces of the two pieces in the plane of abutment is positively prohibited excepting only in the direction of length of the serrations.

Particularly in following out the method first described in employing the tool for forming serrations on a piece of work, the use of serrations of the type shown in Fig. 5 on the cutter blade 60 has certain inherent disadvantages. These disadvantages are that while a cutter blade 60 is passing over a piece of work both sides of the serrations of the cutting edge thereof in contact with the work are removing metal from the work. Consequently a maximum net linear length of cutting edge is in contact with the work which involves the expenditure of a maximum amount of power to accomplish the cutting action. Furthermore, experience has shown that when it is attempted to remove metal from both sides of the serrations being formed in the work it is considerably more difficult to obtain a smooth surface on the serrations being formed. To obviate this disadvantage, that is, to enable the employment of a smaller amount of power in effecting the operation and to obtain a smoother surface for the serrations in the final piece of work, various arrangements and formation of the serrations on the cutter blades may be resorted to.

For instance, as illustrated in Fig. 6 the sides of the serrations on one cutter blade 60 may be relieved while the opposite sides of the serrations on the following cutter blade 60 may be relieved. In other words, as indicated by $a$ in Fig. 6, one cutter blade may have the same side of all of its serrations, indicated as the righthand side in Fig. 6, relieved from the form of the true serrations on such side and which true formation is indicated by the dotted lines. The serrations of the next cutter blade, in the direction opposite to the direction of rotation of the head 58, may have the serrations thereof, indicated in Fig. 6 by $b$, relieved on the opposite sides of the serrations, namely the lefthand side as indicated from the true form of the serrations for such sides as indicated by the dotted lines. In such case the cutter blades with the type of serrations indicated at $a$ will remove metal only from one side of the serrations being formed in the work, while the following cutter blades equipped with the serrations of the type illustrated at $b$ will remove metal from the opposite sides of the serrations being formed in the work. Consequently, with the arrangement of serrations illustrated in Fig. 6 the effective linear dimensions of the cutting edges of the blades 60 are reduced by half as compared to the form shown in Fig. 5, and at the same time it has been found that a smoother finish is imparted to the serrations being formed in the work.

On the other hand, the serrated cutting edges of alternate cutter blades 60 may be relieved as indicated at $c$ in Fig. 6 while the remaining cutter blades may be relieved as indicated at $d$ in Fig. 6. It will be noted that in the serrations indicated at $c$ the opposed faces of every other pair of serrations are relieved from the true form of tooth indicated by the dotted lines. The same is true in the construction shown at $d$ but the teeth $d$ are relieved on those surfaces thereof corresponding with the unrelieved surfaces in the serrations $c$. Thus the cutter blades having the teeth relieved as in $c$ of Fig. 6 will machine alternate serrations in the piece of work radially outwardly from the center of rotation of the cutter head while the following cutter blades will machine those alternate serrations not machined by the preceding cutter blades and will not machine those alternate serrations machined by the preceding cutter blades. The same result is obtained with the construction shown in Fig. 6 as with the construction shown in Fig. 5 as far as reducing the net linear length of the cutting edges on each cutter blade is concerned.

A different arrangement of cutter blade serrations illustrated in Fig. 8. In the arrangement of serrations shown at $e$ every third serration on the cutting edge of the cutter blade is eliminated while in the following cutter blade illustrated at $f$ all of the serrations on the cutting edge of the blade are eliminated with the exception of those in line with those eliminated from the arrangement of teeth shown in $e$. Thus this illustrates another arrangement wherein the serrated edges of one cutter blade act upon only part of the surface of the work being machined, while a following cutter blade acts only upon that part of the work not machined by the preceding blade. This construction likewise reduces the length of the cutting edge of each cutter blade as compared to the construction illustrated in Fig. 5 and, consequently, reduces the amount of power required to perform the operation.

It will be appreciated by those skilled in the art that any desired combination of the arrangement of serrations illustrated in Figs. 5 to 8, inclusive, may be employed for the cutter blades in one tool. That is, any combination of relief or tooth arrangement illustrated in Figs. 5 to 8, inclusive, may be employed when desired in order to improve the characteristics of the machine tool employed to perform the work or the quality of the work itself.

It will be appreciated by those skilled in the art that by positioning the cutting faces 62 of the various blades 60 radially of the axis of rotation of the head 58, and particularly disposing the cutting edges of the various blades 60 in radial relation with respect to the axis of rotation of the head 58, the shaping of the serrated edges 64 of the blades 60 to produce serrations of predetermined size and shape in the finished product is materially simplified as compared to any other arrangement. It will also be appreciated that the particular size and conformation of the serrations in the end surface 64 of the blades 60 having been determined for a radial position of the serrated cutting edges in the head 58, any variation of these cutting edges out of such radial relation would vary the size, shape and contour of the serrations in the final product from that desired. Some means or method must be employed in the practical application of such tool so that in resharpening the blades the new cutting edges thus formed will be re-located in correct radial relation with respect to the axis of rotation of the head 58 if a uniformity in the serrations on the finished work is to result. This is readily accomplished in accordance with the present invention in the following manner. According to one method each blade 60 may seat directly on the bottom of its corresponding slot 66 axially of the head 58, that is without the interposition of the shims 74. In such case when the blades become worn they may be removed from the head 58, and that end face of each one opposite the serrated end 64, may be ground or otherwise machined to remove a predetermined thickness of metal therefrom, after which the blades may be reinserted in place in their respective slots 66 and secured therein. It will be appreciated that because of the angular disposition of the general plane of thickness of the slots 66 with respect to the axis of rotation of the head 58, that under such circumstances the cutting face 62 of each blade 60 will be moved, in the normal direction of movement of the head 58, out of its originally true radial relation with respect to the axis of rotation of the head 58. On the other hand, where the shims 74 are provided as shown and previously described, under such conditions the blades 60 may be loosened in their respective slots and one or more of the shims 74 removed after which the blades may be reinserted and under which condition a relative advancing movement of the cutting face 62 of the various blades, in the direction of normal rotation of the head 58, will have occurred in the same manner as would occur where stock is removed from the corresponding ends of the blades. The head 58 with the blades 60 thus shifted and re-secured in place therein is, under either of the above conditions, then placed in a suitable grinder and stock is removed from the face 62 of each blade until such face 62 is again located radially with respect to the axis of rotation of the head 58. It will be appreciated that in removing stock from the face 62 the worn cutting edge is removed and a new cutting edge is established identical with the original cutting edge inasmuch as the serrations on the end faces 64 of the cutter blades 60 are uniform in size and shape throughout. Thus by the above described method not only are the blades 60 re-sharpened but they are automatically relocated with their cutting edges in the desired radial relation with respect to the axis of rotation of the head 58. The method automatically eliminates the necessity of relocating cutter blades after sharpening as is usually the case in connection with removable blade cutters.

Having thus described my invention what I claim by Letters Patent is:

1. A cutting tool comprising, in combination, a rotatable head having a slot therein opening onto an axial end face of said head and onto a peripheral surface thereof with the general plane of thickness of said slot intersecting the axis of rotation of said head and disposed at an angle with respect thereto, and a cutter blade removably received within said slot and projecting axially beyond an axial face thereof, the outer end of said blade being serrated transversely of the cutting face thereof and said blade being provided with a face intersecting said serrated end surface on a line substantially radial with respect to the axis of rotation of said head.

2. In a tool of the type described, a rotatable supporting head having an axial end face, said head being provided with a plurality of slots therein opening on said end face and inclined away from said face axially of said head in the direction of normal turning movement of said head, a cutter blade removably received in each of said slots and projecting outwardly beyond said end face, the outer end of each of said blades being provided with a cutting face on the advanced side thereof with respect to the normal direction of rotation of said head disposed in a plane substantially including the axis of rotation of said head, and the outer end face of said blades being serrated with the serrations thereof intersecting said cutting face.

3. In a tool of the type described, a rotatable supporting head having an axial end face, said head being provided with a plurality of slots therein opening on said end face and inclined away from said face axially of said head in the direction of normal turning movement of said head, a cutter blade removably received in each of said slots and projecting outwardly beyond said end face, the outer end of each of said blades being provided with a cutting face on the advanced side thereof with respect to the normal direction of rotation of said head disposed in a plane substantially including the axis of rotation of said head, the outer end face of said blades being serrated with the serrations thereof intersecting said cutting face, and means for adjusting the projected relation of said blades in their respective slots with respect to said end face of said head.

4. In a tool of the type described, a rotatable supporting head having an axial end fact, said head being provided with a plurality of slots therein opening on said end face and inclined away from said face axially of said head in the direction of normal turning movement of said head, a cutter blade removably received in each of said slots and projecting outwardly beyond said end face, the outer end of each of said blades being provided with a cutting face on the advanced side thereof with respect to the normal direction of rotation of said head disposed in a plane substantially including the axis of rotation of said head, the outer end face of said blades being serrated with the serrations thereof intersecting said cutting face, means for adjusting the projecting relation of each of said blades in its corresponding slot with respect to said end face of said head, and means for adjusting the position of each of said blades radially with respect to the axis of rotation of said head.

5. In a tool of the type described, in combination, a rotatable supporting head having an axial end face, said head being provided with a plurality of slots therein extending in a general axial direction away from said end face and inclined therefrom in the normal direction of rotation of said head, a cutter blade removably received in each of said slots and having one end thereof projecting axially beyond said axial end face, the outer ends of said cutter blades being serrated and that face of each of said cutter blades at the projecting end thereof more advanced in the normal direction of rotation of said head being provided with a surface intersecting said serrated outer end thereof on a line substantially radial with respect to the axis of rotation of said head, all of said cutter blades projecting beyond said end face an equal amount and each serration on one of said blades being aligned circumferentially of the axis of rotation of said head with corresponding serrations on the remaining of said blades.

6. In a tool of the type described, in combination, a rotatable supporting head having an axial end face, said head being provided with a plurality of slots therein extending in a general axial direction away from said end face and inclined therefrom in the normal direction of rotation of said head, a cutter blade removably received in each of said slots and having one end thereof projecting axially beyond said axial end face, the outer ends of said cutter blades being serrated and that face of each of said cutter blades at the projecting end thereof more advanced in the normal direction of rotation of said head being provided with a surface intersecting said serrated outer end thereof on a line substantially radial with respect to the axis of rotation of said head, one of said blades projecting beyond said end face a lesser amount than any of the remaining blades, and said remaining blades projecting from said face successively greater distances in a direction opposite to the direction of normal rotation of said head from said one of said blades, and corresponding serrations of all of said blades being arranged at the same radial distance from the axis of rotation of said head.

7. A tool for forming curved serrations in a piece of work comprising, in combination, a head having an axial end face, and a plurality of cutter blades angularly spaced from one another about the axis of said head secured therein and projecting beyond said face, the outer ends of said blades being serrated and each blade having a cooperating surface forming therewith a serrated cutting edge, the serrations on two cutter blades next adjacent each other circumferentially of said head being so constructed and arranged that cutting edges formed thereby perform successive cutting actions on a piece of work to be formed thereby, but cutting edges of the first blade remove material from the work at points not engaged by cutting edges of the second blade, and cutting edges of the second blade remove material from the work at points not engaged by cutting edges of the first blade.

JULIUS DUSEVOIR.